United States Patent [19]

Sung et al.

[11] Patent Number: 5,603,215
[45] Date of Patent: Feb. 18, 1997

[54] METHOD AND APPARATUS FOR TREATMENT OF EXHAUST STREAMS

[75] Inventors: Shiang Sung, New York, N.Y.; Patrick L. Burk, Freehold, N.J.

[73] Assignee: Engelhard Corporation, Iselin, N.J.

[21] Appl. No.: 409,111

[22] Filed: Mar. 23, 1995

[51] Int. Cl.$^6$ ........................................................ F01N 3/10
[52] U.S. Cl. .............................. 60/274; 60/284; 60/297; 60/298; 60/300; 60/307; 60/311
[58] Field of Search .................... 60/274, 284, 297, 60/298, 300, 307, 311

[56] References Cited

U.S. PATENT DOCUMENTS

| | | | |
|---|---|---|---|
| 2,942,932 | 6/1960 | Elliott | 423/212 |
| 3,067,002 | 12/1962 | Reid, Jr. et al. | 423/212 |
| 3,699,683 | 10/1972 | Tourtellotte et al. | 60/274 |
| 3,757,521 | 9/1973 | Tourtellotta et al. | 60/274 |
| 4,985,210 | 1/1991 | Minami | 422/169 |
| 5,051,244 | 9/1991 | Dunne et al. | 423/212 |
| 5,078,979 | 1/1992 | Dunne | 423/212 |
| 5,125,231 | 6/1992 | Patil et al. | 60/274 |
| 5,158,753 | 10/1992 | Take et al. | 423/173 |
| 5,184,462 | 2/1993 | Schatz | 60/274 |
| 5,303,547 | 4/1994 | Mieville et al. | 60/274 |
| 5,388,405 | 2/1995 | Fujishita et al. | 60/297 |
| 5,398,503 | 2/1995 | Danno et al. | 60/288 |

FOREIGN PATENT DOCUMENTS

| | | |
|---|---|---|
| 0592713 | 4/1994 | European Pat. Off. |
| 640381A1 | 3/1995 | European Pat. Off. |
| 2118859 | 11/1983 | United Kingdom |
| WO94/11623 | 5/1996 | WIPO |

*Primary Examiner*—Leonard Heyman
*Attorney, Agent, or Firm*—Richard A. Negin

[57] ABSTRACT

In a system for treating an exhaust stream, such as the exhaust of an internal combustion engine (10), the exhaust is initially treated by a first catalytic converter (14) and its effluent is cooled in an indirect heat exchanger (18) with an extraneous coolant fluid, i.e., one other than recycled engine exhaust, before introducing the exhaust into a hydrocarbon trap (30) to adsorb hydrocarbons therefrom at least during a cold-start period of engine operation. Such cooling enables utilization of highly efficient adsorbent materials such as activated carbon which otherwise could not be used. Adsorbed hydrocarbons are desorbed from the hydrocarbon trap (30) as the engine exhaust heats up. The exhaust is passed from hydrocarbon trap (30) to a second catalytic converter (34) for oxidation of the hydrocarbons. The coolant fluid may be air and the heated air obtained from the heat exchanger (18) may be introduced into the oxidation catalytic converter (34) to heat the latter at least during cold-start operation and to supply additional oxygen.

24 Claims, 2 Drawing Sheets

METHOD AND APPARATUS FOR TREATMENT OF EXHAUST STREAMS

BACKGROUND OF THE INVENTION

1. Field of the Invention

This invention relates to the treatment of a gaseous exhaust stream, and more specifically to a method and apparatus for treating an engine exhaust stream containing pollutants including hydrocarbons both during a cold-start period and a subsequent operating period.

2. Related Art

Molecular sieves, including zeolites, are known for adsorbing hydrocarbons from gas streams such as engine exhaust in exhaust gas purification schemes which also include contacting the exhaust gas with a catalyst. For example, U.S. Pat. No. 4,985,210 to Minami, dated Jan. 15, 1991, is directed to an exhaust gas purifying apparatus for an automobile employing a three-way catalyst with either a Y-type zeolite or a mordenite used in a hydrocarbon trap upstream of the three-way catalyst. A bed of activated carbon may be disposed upstream of the adsorbent zone and a valve mechanism serves to by-pass the activated carbon bed at certain temperatures of the exhaust gas stream.

U.S. Pat. No. 5,051,244 to Dunne et al, dated Sep. 24, 1991, concerns passing an engine exhaust stream through a molecular sieve to adsorb hydrocarbons during the cold-start phase of engine operation. As the engine heats up and the hydrocarbons begin to desorb, the molecular sieve is by-passed until a catalyst is at its operating temperature, at which point the gas stream is again flowed through the molecular sieve to desorb hydrocarbons and carry them to the catalyst zone. A paper by M. Heimrich, L. Smith and J. Kotowski entitled *Cold-Start Hydrocarbon Collection for Advanced Exhaust Emission Control*, SAE Publication Number 920847, discloses an apparatus which functions in a manner similar to that of U.S. Pat. No. 5,051,244.

U.S. Pat. No. 5,125,231 to Patil et al, dated Jun. 30, 1992, discloses an engine exhaust system for reducing hydrocarbon emissions, including the use of Beta-zeolites as hydrocarbon adsorbents (see column 5, lines 63 through column 6, line 14). Zeolites having a silica/alumina ratio in the range of 70/1 to 200/1 are preferred adsorbents (see column 6, lines 7–11). The apparatus provides for by-passing a first converter during cold-start operation and, when the first converter reaches its light-off temperature, either by-passing the second converter or recycling effluent from it to the first converter (see e.g., column 10, lines 10–28).

U.S. Pat. No. 2,942,932 to Elliott, dated Jun. 28, 1960, discloses the use of an adsorbent bed to adsorb hydrocarbons in an exhaust gas stream, which hydrocarbons are desorbed as the exhaust gas heats up. The effluent from the adsorbent bed is mixed with air in an eductor and fed to an oxidation catalyst zone.

U.S. Pat. No. 3,699,683 to Tourtellotte et al, dated Oct. 24, 1972, discloses a system for the prevention of hydrocarbon emissions from engines during start-up, in which a reducing catalyst bed, an oxidizing catalyst bed and an absorbent bed are positioned in series for treatment of the engine exhaust. An air blower supplies air between the reducing catalyst bed and the oxidizing catalyst bed and a valve system is provided to permit by-passing the absorbent bed which is regenerated by passing a small stream of hot exhaust gas through it.

U.S. Pat. No. 5,158,753 to Take et al, dated Oct. 27, 1992, discloses an engine exhaust gas purifying apparatus in which the engine exhaust is passed through the hot side of a heat exchanger, then through a hydrocarbon adsorption zone, the effluent of which is passed through the cold side of the heat exchanger in heat exchange with the hot exhaust gases emanating from the engine and then passed into a catalyst. In one embodiment, a catalyst is contained on the cold side of the heat exchanger.

SUMMARY OF THE INVENTION

The present invention relates to an apparatus and method for treating exhaust streams such as engine exhaust streams, the apparatus having a first catalyst zone and a second, oxidation catalyst zone, with a heat exchanger and an adsorbent zone disposed in series flow between the first and second catalyst zones. The exhaust stream effluent from the first catalyst zone is cooled by indirect heat exchange with a coolant fluid, e.g., air, passed through the heat exchanger prior to entry of the effluent into the adsorbent zone. This serves to protect the adsorbent material from excessively high temperatures and to enhance adsorption of hydrocarbons from the exhaust stream, at least during cold-start operation. (As used herein and in the claims, "coolant fluid" means a coolant fluid other than the exhaust stream or a portion thereof.) As the exhaust stream heats up during engine operation, hydrocarbons are desorbed from the adsorbent material and are passed through the second, oxidation catalyst zone which may be supplied with heated air from the heat exchanger.

Specifically, in accordance with the present invention there is provided a method for treating an exhaust stream, e.g., the exhaust of an internal combustion engine, containing pollutants which comprise hydrocarbons. (The exhaust stream may further comprise nitrogen oxides, in which case the first catalyst, described below, may be a three-way conversion catalyst.) In any case, the treatment includes contacting the exhaust stream with a catalyst during both a cold-start period in which the catalyst is at a temperature at or below its light-off temperature and a subsequent operating period during which the catalyst is at a temperature above its light-off temperature. The method comprises the following steps (a) through (e). (a) The exhaust stream is contacted with a first catalyst in a first catalyst zone under conditions to convert at least some of the pollutants to innocuous materials at least during the operating period, and a first catalyst zone effluent is withdrawn from the first catalyst zone. (b) The first catalyst zone effluent is cooled within a heat exchange zone by heat exchange with a coolant fluid and the resultant cooled first catalyst zone effluent and the resultant heated coolant fluid are withdrawn from the heat exchanger. (c) The cooled first catalyst zone effluent is introduced into a hydrocarbon adsorption zone containing an adsorbent material, e.g., one or more of activated carbon, zirconia-alumina, zirconia-titania, zirconia-silica, silica-alumina or one or more zeolites, and therein the cooled first catalyst zone effluent is contacted with the adsorbent material to adsorb hydrocarbons from the cooled effluent. The adsorbed hydrocarbons are retained within the adsorption zone at least during the cold-start period, and are desorbed from the adsorbent material during the operating period. The exhaust stream is discharged from the adsorbent zone to provide an adsorption zone effluent which, at least during the operating period, contains desorbed hydrocarbons. (d) The adsorption zone effluent is passed to a second, oxidation catalyst zone and contacted therein with a second, oxidation catalyst under oxidizing conditions so as to catalyze, at least during the operating period, the oxidation of hydrocarbons in the adsorption zone effluent. (e) The thus-treated exhaust is withdrawn from the second, oxidation catalyst zone.

In another aspect of the present invention, the coolant fluid comprises an oxygen-containing gas and the method includes the step of withdrawing the heated oxygen-containing gas from the heat exchange zone and introducing at least a portion of the heated oxygen-containing gas into the second, oxidation catalyst zone.

According to another aspect of the present invention, the method may include transferring heat from the heated coolant fluid to the second, oxidation catalyst zone.

Yet another aspect of the present invention includes maintaining the exhaust in the first catalyst zone in indirect heat exchange with the adsorption zone effluent in the second, oxidation catalyst zone to heat the adsorption zone effluent within the second, oxidation catalyst zone.

Still another aspect of the present invention includes maintaining the exhaust within the second, oxidation catalyst zone in indirect heat exchange relation with the heated coolant fluid effluent from the heat exchanger. For example, the adsorption zone effluent may be heated to a temperature at least 20° C. higher than its temperature at the adsorption zone outlet.

In accordance with another aspect of the present invention, there is provided an apparatus for treating an exhaust stream containing pollutants comprising hydrocarbons, the apparatus comprising the following components. A first catalyst, e.g., a three-way conversion catalyst, is contained within a first catalyst zone which has an inlet which is connectible in gas-flow communication with a source of the exhaust stream and an outlet for discharging effluent of the first catalyst zone. An indirect heat exchange means has a cold side flow path including a cold side inlet and a cold side outlet, and a hot side flow path including a hot side inlet and a hot side outlet, the hot side inlet being connected in gas-flow communication with the outlet of the first catalyst zone to receive the effluent thereof. A hydrocarbon adsorbent material, e.g., one or more of activated carbon, zirconia-alumina, zirconia-titania, zirconia-silica, silica-alumina or one or more zeolites is contained within an adsorption zone which has an adsorption zone inlet connected in gas-flow communication with the hot side outlet of the heat exchange zone, and also has an adsorption zone outlet. A second, oxidation catalyst is contained within a second catalyst zone having a second catalyst zone inlet connected in gas-flow communication with the adsorbent zone outlet. A second catalyst zone outlet is provided for discharge from the second catalyst zone of the treated exhaust.

Another apparatus aspect of the invention provides for further including coolant supply means, e.g., an air pump, connected to the cold side inlet of the heat exchanger to introduce a coolant fluid into the heat exchanger through the cold side flow path thereof, and a first fluid conduit means connecting the cold side outlet of the heat exchanger in fluid flow communication with the second catalyst zone inlet.

Yet another aspect of the invention provides that the apparatus further includes second fluid conduit means connected at one end to the cold side outlet and connected at its other end to a second heat exchanger.

In still another aspect of the invention, the first catalyst zone comprises one flow path side of an indirect heat exchanger and the second, oxidation catalyst zone comprises the other flow path side of the indirect heat exchanger. Alternatively, the second, oxidation catalyst zone may comprise one flow path side of another indirect heat exchanger the other flow path side of which may be connected by a fluid conduit means to the cold side outlet of the first indirect heat exchanger.

Other aspects of the invention will become apparent from the following description.

DETAILED DESCRIPTION OF THE INVENTION AND SPECIFIC EMBODIMENTS THEREOF

Exhaust streams which require treatment for the removal of pollutants, such as hydrocarbons, are generated by various sources, perhaps the most common of which is the internal combustion engine, primarily gasoline-fueled engines and diesel engines. Other sources of exhaust streams exist, such as industrial processes which generate oxidizeable pollutants such as volatile organic compounds and these also are effectively treated by the method and apparatus of the present invention. Gasoline-fueled engines generate an exhaust containing as primary pollutants hydrocarbons ("HC") resulting from unburned or partially burned gasoline, carbon monoxide ("CO") and various nitrogen oxides ("$NO_x$"). Diesel exhaust includes gaseous hydrocarbons, a hydrocarbon soluble oil fraction which may be gaseous or in an aerosol liquid state depending on the exhaust temperature, solid carbonaceous particulates, CO and nitrogen oxides. As indicated by the above discussion of related art, it is known in the art to utilize a system containing one or more catalysts and a hydrocarbon trap, the hydrocarbon trap being an adsorbent material such as a zeolite which serves to adsorb hydrocarbons during a cold-start period prior to the engine exhaust attaining a sufficiently high temperature for effective utilization of the catalyst. By adsorbing the hydrocarbons during the cold-start period and desorbing them as the exhaust stream heats up, the hydrocarbons are effectively stored until the catalyst is at a temperature high enough to efficiently catalyze oxidation of the hydrocarbons.

Less expensive and-more effective adsorbents than zeolites are known, for example, activated carbon which is about twice as effective in the adsorption of hydrocarbons as are zeolites, and is less expensive. However, hydrocarbon traps in the exhaust treatment system of an internal combustion engine are often subjected to temperatures well in excess of 400° C. In the presence of oxygen and under such conditions, the activated carbon would be oxidized.

Figure 1A:
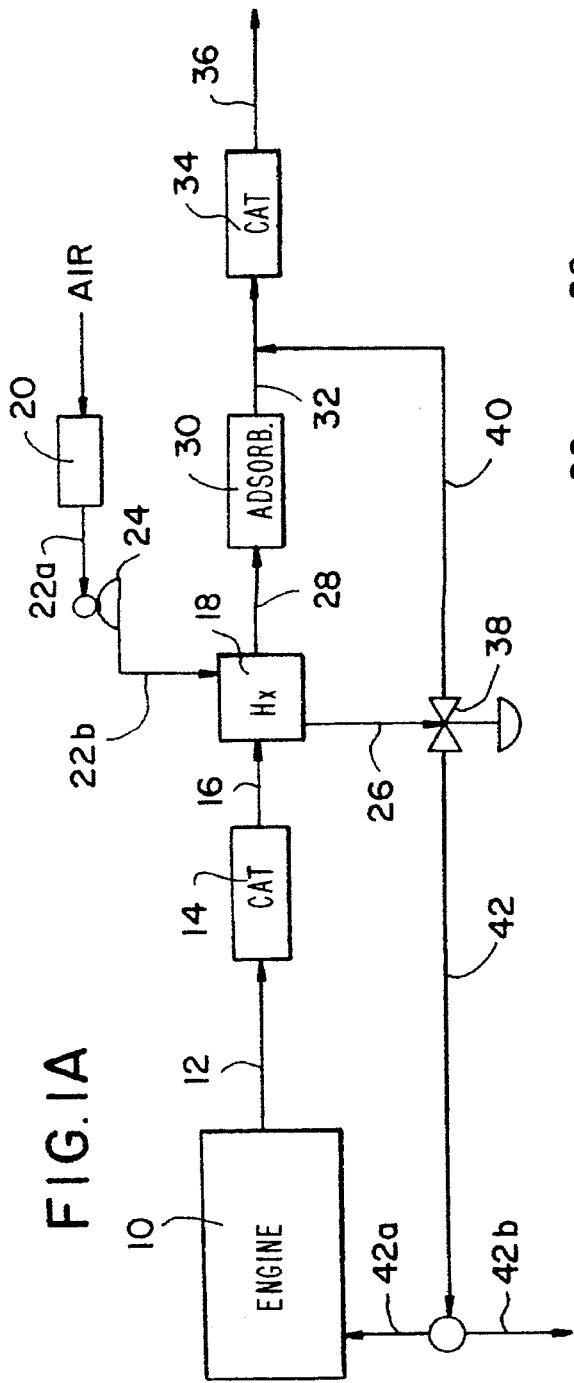
FIG. 1A is a schematic representation of apparatus in accordance with one embodiment of the present invention connected to an internal combustion engine in order to treat the exhaust stream thereof.

FIG. 1A schematically illustrates one embodiment of the present invention wherein an internal combustion engine such as a gasoline-fueled engine 10 has an exhaust pipe 12. Engine 10 may comprise the power plant of an automobile or other vehicle or craft or it may comprise a stationary engine. In any case, exhaust pipe 12 is connected to a first catalytic converter 14 within which is disposed any suitable first catalyst. For a gasoline-fueled engine, the initial catalyst treatment may be by use of so-called "three-way conversion catalysts" such catalysts being referred to as "three-way"

because they are able to catalyze, effectively simultaneously, the oxidation of hydrocarbons and CO and the reduction of $NO_x$ to innocuous materials, i.e., $H_2O$, carbon dioxide and nitrogen in exhaust gas from a combustion mixture that has a substantially stoichiometrical air/fuel content. Such catalysts are well-known in the art and typically comprise a metal or ceramic-like, e.g., cordierite, honeycomb substrate containing a plurality of fine gas-flow channels, the walls of which are coated with a catalytic material. The latter may comprise a refractory metal oxide support such as activated alumina on which is dispersed catalytic components such as platinum, either alone or in combination with rhodium and/or palladium. The catalytic material may also contain other metal catalytic components such as oxides of nickel, iron and/or manganese as well as other catalytic materials and/or promoters. For efficient operation of a three-way conversion catalyst, it is known to operate the engine so that the exhaust is at, or very close to, a stoichiometric air/fuel ratio so that the three-way catalyst will effectively catalyze both the oxidation of hydrocarbons and CO to $H_2O$ and carbon dioxide, and the reduction of nitrogen oxides to nitrogen. It will be appreciated that engine 10 may also be a diesel engine, in which case the first catalytic converter 14 will contain any suitable diesel catalyst.

During cold-start operation, when the exhaust stream of engine 10 at the inlet of the first catalyst zone is at a relatively low temperature, i.e., from ambient to light-off temperature, e.g., 250° C., the first catalyst is not as efficient or effective in converting pollutants, including hydrocarbons, to innocuous substances as it will be at higher operating temperatures, and significant amounts of pollutants, especially the hydrocarbon pollutants, escape unconverted from the first catalytic converter 14. It is well-known in the art that a disproportionately higher share of the total hydrocarbon emissions from engine operation during cold-start and operating periods is engendered during the cold-start period.

The effluent of the first catalytic converter 14 is withdrawn by conduit 16 and introduced into an indirect heat exchanger 18 wherein the first catalyst zone effluent is passed through the hot side flow path of the heat exchanger 18. (As used herein and in the claims, "indirect" heat exchange means heat exchange through a wall or other barrier which separates the fluid being heated from the fluid supplying the heat and therefore being cooled, as opposed to direct heat exchange engendered by mixing together relatively hot and cold fluids. An "indirect" heat exchanger as used herein and in the claims means any suitable apparatus which enables indirect heat exchange between two fluids.) Heat exchanger 18 may be any suitable type of indirect heat exchanger, such as a shell and tube heat exchanger, a crossflow, spiral or plate heat exchanger, and may be made of metal or ceramic, although metal is preferable because of its better heat transfer characteristics.

An air inlet 20 is equipped with an air filter and is connected by line 22a to an air pump 24 then via line 22b to heat exchanger 18 to provide the coolant supply means of the apparatus. The discharge of air pump 24 is fed by line 22b to the cold side inlet of heat exchanger 18. Air heated within heat exchanger 18 by indirect heat exchange with the effluent of the first catalytic converter 14 is discharged from heat exchanger 18 via line 26.

The catalyst zone effluent from first catalytic converter 14 is cooled within heat exchanger 18 by indirect heat exchange with the coolant fluid air and the cooled, first catalyst zone effluent is passed via a fluid conduit means provided by line 28 into an adsorbent zone provided, in the illustrated embodiment, by a hydrocarbon trap 30. For example, the first catalyst zone effluent may advantageously be cooled to a temperature of less than about 400° C., e.g., to a temperature of less than 375° C. during the entire period of engine operation. Hydrocarbon trap 30 comprises a canister or other suitable container within which is disposed a bed of a suitable adsorbent material which may comprise a zeolite or an adsorbent material such as activated carbon, zirconia-alumina, zirconia-titania or zirconia-silica or silica-alumina. The heat exchanger 18 will be sized to protect the adsorbent materials within hydrocarbon trap 30 from excessively high temperatures and to augment the ability of hydrocarbon trap 30 to withhold hydrocarbons from the exhaust stream during cold-start operation., i.e., to keep hydrocarbon trap 30 below its desorption temperature during cold-start operation. Because of the high heat capacity of the liquid coolant fluids, such as water or water-ethylene glycol mixtures, as compared to air, a smaller heat exchanger 18 is feasible than for a gas/gas heat exchanger. Another advantage of using a liquid coolant fluid is that it facilitates the use of many non-zeolitic materials (which generally do not have the same degree of thermal stability as have zeolites) for the adsorbent material. By modifying the size of heat exchanger 18, the direction of flow (co-current or counter-current), the surface area of the heat exchanger, the coolant flow rate, etc., such thermally less-stable non-zeolitic materials can be protected from excessively high temperatures, even at an exhaust inlet temperature of 900° C. during peak acceleration of an engine. Within the hydrocarbon trap, hydrocarbons contained within the cooled effluent, which advantageously may have been cooled to a temperature of from about ambient to less than 200° C., are adsorbed by the adsorbent material.

The cooling of the exhaust stream in heat exhanger 18 will significantly enhance adsorption of hydrocarbons by the adsorbent material contained within hydrocarbon trap 30 because adsorption is strongly temperature-dependent and is enhanced at lower temperatures. Thus, the described process enhances the rate of adsorption of hydrocarbons regardless of which type of adsorbent material is utilized. The adsorbent material may well be a zeolite but, because of the low temperatures of the exhaust stream provided by heat exchanger 18, adsorbent materials such as activated carbon, which cannot sustain temperatures of 400° C. or higher in the presence of oxygen, may be utilized.

When engine 10 is first started and the exhaust generated from it is relatively cold, a quantity of the pollutants contained therein, especially the hydrocarbon pollutants, will not be converted within first catalytic converter 14 because the temperature of the exhaust being treated is below that temperature at which the three-way catalyst effectively catalyzes the oxidation of hydrocarbons (and of CO) to $H_2O$ and $CO_2$. At the relatively low temperature at which the cooled (in heat exchanger 18) effluent of the first catalytic converter 14 is introduced into contact with the adsorbent material within hydrocarbon trap 30, most if not all of those hydrocarbons will be adsorbed within and retained in the adsorbent material.

The treated stream emerges from hydrocarbon trap 30 via line 32 and is introduced into a second catalytic converter 34 within which is disposed any suitable oxidation catalyst. Many such types of catalysts are well-known to those skilled in the art and a particularly effective oxidation catalyst comprises a honeycomb-type support as described above in connection with first catalytic converter 14, on the gas-flow passage walls of which is disposed a catalytic material comprising a platinum catalyst component dispersed on a refractory metal oxide such as gamma alumina. The effluent from second catalytic converter 34 is discharged to the atmosphere via a tailpipe 36.

The heated coolant fluid, which in the illustrated embodiment comprises air, is discharged from heat exchanger 18 via line 26 and is transmitted through valve 38, which may be a proportional split valve. Valve 38 may divert a first portion of the heated air via line 40 and then line 32 to the inlet of second catalytic converter 34. This heated air will, during cold-start operation, increase the temperature of the effluent contacted with the oxidation catalyst contained within second catalytic converter 34 and provide supplemental oxygen for the oxidation of hydrocarbons within second catalytic converter 34. For example, the adsorption zone effluent may thus be heated within the second, oxidation catalyst zone to at least 20° C. above its temperature at the adsorption zone outlet. On the other hand, during the operating period, especially during acceleration and deceleration, or other instances of high-temperature excursions of the exhaust, the air added to the in-flow to second catalytic converter 34 can act as a coolant, thereby reducing high temperature degradation of the second, oxidation catalyst within second catalytic converter 34. When the exhaust gas is expected to attain such high temperatures, a temperature-stable adsorbent, such as a zeolite, is used in trap 30, rather than activated carbon. As the temperature of the exhaust gas produced by engine 10 increases, the cold-start period ends and the operating period begins. During the operating period the three-way catalyst contained within first catalytic converter 14 increases in efficiency due to the increased temperature of the stream being supplied to it and begins to convert a higher percentage of the pollutants contained within the exhaust stream. In addition, as the exhaust stream increases in temperature, the temperature of the cooled effluent emerging from heat exchanger 18 correspondingly increases until a desorption temperature is reached within hydrocarbon trap 30. As the desorption temperature is reached and exceeded, hydrocarbons contained in the adsorbent material within hydrocarbon trap 30 are desorbed. The increased temperature of the exhaust and the diversion of at least part of the heated air via line 40 into second catalytic converter 34 enhances oxidation of the desorbed hydrocarbons as well as those hydrocarbons which escaped oxidation in first catalytic converter 14, and of CO contained in the exhaust. Thus, during the operating period of engine 10, the adsorbent material within hydrocarbon trap 30 is regenerated and the desorbed hydrocarbons, as well as CO and other hydrocarbons in the stream, are oxidized in second catalytic converter 34 to $H_2O$ and $CO_2$.

A second portion of the heated air withdrawn from heat exchanger 18 may be diverted by valve 38 via line 42 for one or both of recycle via line 42a as combustion air to engine 10 or for diversion via line 42b to heat the passenger cabin of the vehicle powered by engine 10, or for any other desired purpose. For example, it is known to fractionate the gasoline or other fuel for a vehicle engine to provide a light and heavy fraction thereof, and to feed the light fraction to the engine during cold-start operation to reduce the generation of pollutants. Some of the heated air obtained from heat exchanger 18 may be diverted via line 42b for such purpose.

In an alternate scheme, all or part of the heated coolant fluid withdrawn from heat exchanger 18 via line 26, whether the coolant fluid is a liquid or a gas such as air, may be used to heat second catalytic converter 34, i.e., by indirect heat exchange therewith during the cold-start period. When the coolant fluid is air, direct heating of the exhaust gas can be achieved by injecting the air into the exhaust gas stream at the junction of line 32 and line 40, as shown in FIG. 1A.

Figure 1B:
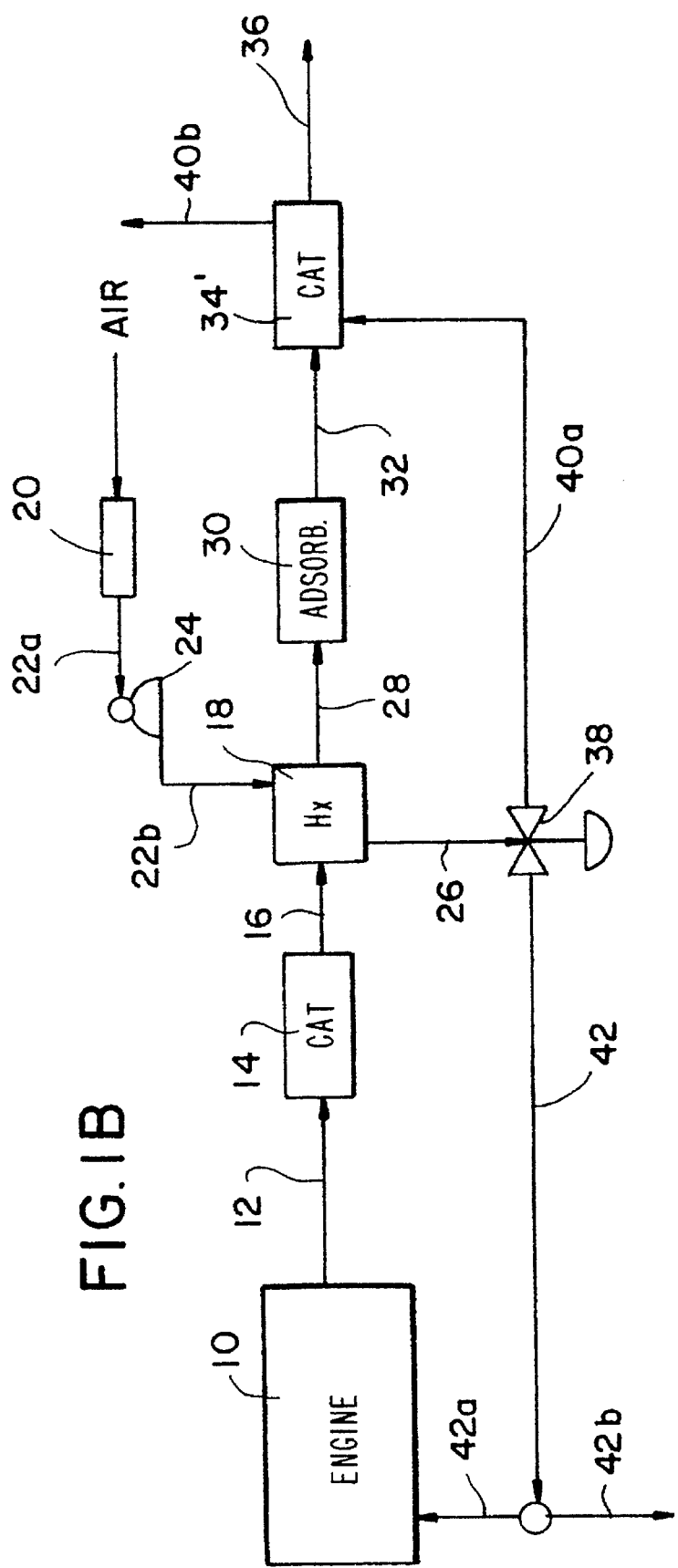
FIG. 1B is a view similar to FIG. 1A of an apparatus in accordance with another embodiment of the present invention.

An alternate embodiment of the invention is shown in FIG. 1B. FIG. 1B is, except as otherwise described in this paragraph, substantially the same as that of FIG. 1A, and parts of FIG. 1B are numbered identically to the corresponding parts of FIG. 1A, so the operation of the embodiment of FIG. 1B can generally be understood by reference to FIG. 1A and its description, in conjunction with the following. In the embodiment of FIG. 1B, the second, oxidation catalyst zone comprises one flow path side of a second indirect heat exchanger 34'. The apparatus of FIG. 1B, like that of FIG. 1A, comprises a second fluid conduit means provided by line 40a which serves as a conduit to carry coolant fluid, e.g., air, from the outlet of heat exchanger 18 to the other flow path side of heat exchanger 34'. A line 40b carries the coolant fluid away from heat exchanger 34', optionally to be added to the fluid in line 42. The embodiment of FIG. 1B thus allows heat exchange between the heated coolant fluid and the exhaust gas to occur within the second, oxidation catalyst zone provided by heat exchanger 34'.

The utilization of an extraneous coolant fluid enables extensive cooling of the effluent of first catalytic converter 14 prior to its introduction into the hydrocarbon trap 30, whether the coolant fluid is air, as in the illustrated embodiment, or another oxygen-containing gas, or a liquid coolant supplied from a reservoir, for example, a reservoir which also supplies liquid coolant to engine 10. Consequently, under many operating conditions, the catalyst contained within first catalytic converter 14 will reach relatively high temperatures with consequent efficient conversion of pollutants, and yet the effluent fed to the adsorbent material within hydrocarbon trap 30 will be cool enough to enable highly efficient adsorption of residual hydrocarbons contained within the exhaust. The diversion of heated oxygen-containing gas, e.g., air, from heat exchanger 18 to the inlet of second catalytic converter 34 provides an increased temperature therein and provides excess oxygen to facilitate the oxidation of residual hydrocarbons in second catalytic converter 34. The enhanced temperature provided by diversion of at least some of the heated oxygen-containing gas from heat exchanger 18 to second catalytic converter 34 means that it is feasible to employ less expensive oxidation catalysts which contain less, or none, of a platinum group metal such as platinum and utilizes less expensive base metal catalysts. Further, the adsorbent material contained within hydrocarbon trap 30 may also serve as a scavenger for phosphorus, zinc sulphates and other catalyst poisons which will protect base metal catalysts such as nickel, molybdenum, cobalt, chromium, manganese, iron, etc., used as components of the oxidation catalyst within second catalytic converter 34.

Figure 2:
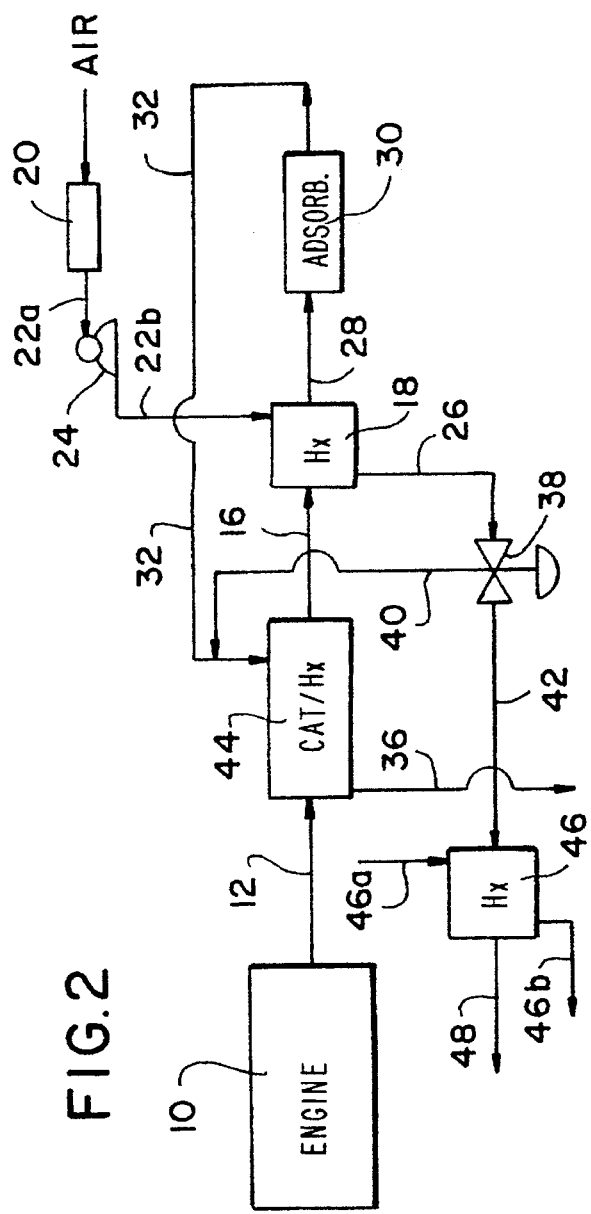
FIG. 2 is a schematic view of another embodiment of the present invention connected to the exhaust of an internal combustion engine.

Referring now to FIG. 2 there is shown another embodiment of the present invention in which parts which are identical to those of FIG. 1A and which function identically to the parts in the FIG. 1A embodiment are identically numbered. That description of FIG. 2 which would be repetitive to that given in connection with FIG. 1A is omitted. In the embodiment of FIG. 2, both the first catalyst and the second, oxidation catalyst are contained within a catalytic converter 44 which essentially comprises a catalyzed indirect heat exchanger, one flow path side of which is coated with the first catalyst and the other flow path side of which is coated with the second, oxidation catalyst. In the illustrated embodiment of FIG. 2, valve 38 splits the heated air discharged from the cold side of heat exchanger 18 via line 26, diverting a portion of the heated air via line 40 for mixture with the adsorbent zone effluent in line 32 to the inlet to the catalyst contained in the cool side flow path of catalytic converter 44. After the adsorption zone effluent is contacted with the oxidation catalyst it is withdrawn via tailpipe 36.

During its passage through the oxidation catalyst zone provided by the cold side flow path of cross-flow catalytic converter 44, the effluent is heated by indirect heat exchange with the hot exhaust stream introduced via exhaust pipe 12 to the hot side flow path of catalytic converter 44. In this way, the hot engine exhaust is simultaneously contacted with the first catalyst, such as a three-way catalyst coated onto the gas-flow passages of the hot side flow path of catalytic converter 44, and gives up heat to the hydrocarbon trap effluent passing through the second, oxidation catalyst zone which thereby simultaneously heated while contacted with the oxidation catalyst. In three-way catalysts used to treat gasoline-fueled engine exhausts, the oxidation reactions predominate. Inasmuch as the oxidation reactions are exothermic, the net heat of reaction tends to increase the temperature of the stream being treated by the three-way catalyst.

A portion of the heated air withdrawn via line 26 may be diverted by valve 38 via line 42 to a recovery heat exchanger 46 which is supplied with a second coolant fluid through line 46a, the second coolant fluid being withdrawn through line 46b. The heated air introduced into recovery heat exchanger 46 via line 42 is withdrawn and discharged to the atmosphere via line 48. Recovery heat exchanger 46 may be used to heat the passenger cabin of the vehicle in which engine 10 is installed, or for any other purpose including fractionating fuel fed to engine 10, etc.

EXAMPLE 1

The temperature of the exhaust stream immediately prior to entering the heat exchanger 18 of FIG. 1A or FIG. 2 is 400° C. A corrugated plate heat exchanger 18 containing 36 plates each measuring 12 inches by 4 inches (30.5 centimeters ("cm") by 10.2 cm), cools the exhaust stream to below 200° C. with ambient air as the coolant fluid. The coolant fluid air is heated to above 300° C., providing sensible enthalpy for light-off enhancement of the second, oxidation catalyst in catalytic converter 34.

|  | Hot Side | Cold Side |
| --- | --- | --- |
| Air, liters/min[1] | 2,000 | 1,000 |
| Temperature, °C. In | 400[2] | 25[3] |
| Out | <200[4] | 325[5] |
| Direction of fluids |  | Counter-current |
| No. of plates |  | 36 |
| Heat Transfer Coeff. BTU/lb-F.°-hr |  | 10 |
| Single plate effective surface area |  | 0.27 ft² (250 cm²) |

[1] As measured at standard conditions of temperature and pressure ("STP"), i.e., 20° C. and 1 atmosphere.
[2] Exhaust, line 16 of the Figures.
[3] Coolant air, line 22b of the Figures.
[4] Exhaust, line 28 of the Figures.
[5] Heated coolant air, line 26 of the Figures.

EXAMPLE 2

When using a liquid as the coolant fluid, e.g., water or a water-antifreeze (ethylene glycol) mixture, a much greater degree of cooling can be attained and/or a smaller heat exchanger 18 can be used.

|  | Hot Side | Cold Side |
| --- | --- | --- |
| Flow Rate, liters/min[1] | 2,000 | 3 |
| Temperature, °C. In | 800[2] | 25[3] |
| Out | <200[4] | 110[5] |
| Direction of fluids |  | Co-current |
| No. of plates |  | 34 |
| Heat Transfer Coeff. BTU/hr |  | 60,400 |
| Single plate effective surface area |  | 0.27 ft² (250 cm²) |

[1] As measured at STP. See footnote [1] of Example 1.
[2] Exhaust, line 16 of the Figures.
[3] Coolant liquid into heat exchanger.
[4] Exhaust, line 28 of the Figures.
[5] Coolant liquid out of heat exchanger.

Using a liquid coolant fluid loses the benefit of having a supply of heated air to introduce into second catalytic converter 34 unless the heated liquid coolant fluid is further heat-exchanged in a second heat exchanger to heat an air supply for second catalytic converter 34. Alternatively, two heat exchangers (or two coolant fluid flow paths in a heat exchanger) may be used to cool the effluent of first catalytic converter 14, one using a liquid coolant fluid and the other an air coolant fluid which can be supplied, when heated, to second catalytic converter 34.

While the invention has been described in detail with respect to specific preferred embodiments thereof, it will be appreciated that numerous variations may be made thereto which will nonetheless lie within the scope of the invention and the appended claims.

What is claimed is:

1. A method for treating an exhaust stream containing pollutants which comprise hydrocarbons, comprising the steps of:

(a) contacting the exhaust stream with a first catalyst in a first catalyst zone during a cold-start period in which the first catalyst is at a temperature at or below its light-off temperature;

(b) contacting the exhaust stream with the first catalyst in the first catalyst zone under conditions to convert at least some of the pollutants to innocuous materials at least during an operating period subsequent to the cold-start period;

(c) withdrawing a first catalyst zone effluent from the first catalyst zone;

(d) cooling the first catalyst zone effluent within a heat exchange zone by heat exchange with a cooling fluid and withdrawing the resultant cooled, first catalyst zone effluent and the resultant heated coolant fluid from the heat exchanger zone;

(e) introducing the cooled first catalyst zone effluent into a hydrocarbon adsorption zone containing an adsorbent material and therein contacting the cooled first catalyst zone effluent with the adsorbent material to adsorb hydrocarbons from the cooled effluent;

(f) retaining adsorbed hydrocarbons within the adsorption zone at least during the cold-start period;

(g) desorbing the adsorbed hydrocarbons from the adsorbent material during the operating period;

(h) discharging the exhaust stream from the adsorbent zone to provide an adsorption zone effluent which, at least during the operating period, contains desorbed hydrocarbons;

(i) passing the adsorption zone effluent to a second, oxidation catalyst zone and contacting it therein with a second oxidation catalyst under oxidizing conditions so as to catalyze at least during the operating period, the oxidation of desorbed hydrocarbons in the adsorption zone effluent and other exhaust stream hydrocarbons; and (j) withdrawing the thus-treated exhaust stream from the second, oxidation catalyst zone.

2. The method of claim 1 wherein the coolant fluid comprises an oxygen-containing gas and including the step of withdrawing the heated oxygen-containing gas from the heat exchange zone and introducing at least a portion of the heated oxygen-containing gas into the second, oxidation catalyst zone.

3. The method of claim 1 including transferring heat from the heated coolant fluid to the second, oxidation catalyst zone.

4. The method of claim 3 wherein transferring heat from the heated coolant fluid to the second, oxidation catalyst zone comprises maintaining the exhaust stream within the second, oxidation catalyst zone in indirect heat exchange relation with the heated coolant fluid effluent from the heat exchanger.

5. The method of claim 1 including recovering heat from the heated coolant fluid.

6. The method of claim 1 or claim 2 wherein the exhaust stream further comprises nitrogen oxides and the first catalyst is a three-way conversion catalyst.

7. The method of claim 6 wherein the exhaust stream emanates from an internal combustion engine.

8. The method of claim 1 or claim 2 including maintaining the exhaust stream in the first catalyst zone in indirect heat exchange with the adsorption zone effluent in the second, oxidation catalyst zone to heat the adsorption zone effluent within the second, oxidation catalyst zone.

9. The method of claim 8 comprising maintaining the adsorption zone effluent within the second, oxidation catalyst zone at a temperature at least 20° C. higher than its temperature at the adsorption zone outlet.

10. The method of claim 1 or claim 2 including cooling the first catalyst zone effluent to a temperature of less than about 400° C., and wherein the adsorbent material is selected fro the group consisting of activated carbon, zirconia-alumina, zirconia-titania, zirconia-silica, silica-alumina and at least one zeolites.

11. The method of claim 10 including cooling the first catalyst zone effluent to a temperature of less than about 375° C.

12. The method of claim 11 wherein the adsorbent material comprises activated carbon.

13. A method of treating an exhaust stream which varies in temperature at its source from ambient to 900° C. and contains pollutants which comprise hydrocarbons, comprising the steps of:

(a) contacting the exhaust stream with a first catalyst in a first catalyst zone during a cold-start period in which the first catalyst is at a temperature at or below its light-off temperature;

(b) contacting the exhaust stream with the first catalyst in the first catalyst zone under conditions to convert at least some of the pollutants to innocuous materials at least during an operating period subsequent to the cold-start period;

(c) withdrawing a first catalyst zone effluent from the first catalyst zone;

(d) cooling the first catalyst zone effluent within a heat exchange zone by heat exchange with a coolant fluid to provide a cooled, first catalyst zone effluent having a temperature of less than about 400° C., and a heated coolant fluid;

(e) introducing the cooled first catalyst zone effluent into a hydrocarbon adsorption zone containing an adsorbent material selected from the class consisting of activated carbon, zirconia-alumina, zirconia-titania and zirconia-silica, silica-alumina and one at least one zeolite and therein contacting the cooled first catalyst zone effluent with the adsorbent material to adsorb hydrocarbons from the cooled effluent;

(f) retaining adsorbed hydrocarbons within the adsorption zone at least during the cold-start period;

(g) desorbing adsorbed hydrocarbons from the adsorbent material during the operating period;

(h) discharging the exhaust stream from the adsorbent zone to provide an adsorption zone effluent which, at least during the operating period, contains desorbed hydrocarbons;

(i) heating the adsorption zone effluent to raise the temperature by at least about 20° C.;

(j) passing the adsorption zone effluent to a second oxidation catalyst zone and contacting the heated adsorption zone effluent therein with a second oxidation catalyst under oxidizing conditions so as to catalyze, at least during the operating period, the oxidation of desorbed hydrocarbons in the adsorption zone effluent and other exhaust stream hydrocarbons; and (k) withdrawing the thus-treated exhaust stream from the second, oxidation catalyst zone.

14. The method of claim 13 wherein the coolant fluid is air and including the step of withdrawing the heated air from the heat exchange zone and introducing at least a portion of the heated air into the second, oxidation catalyst zone.

15. The method of claim 13 or claim 14 including maintaining the exhaust stream in the first catalyst zone in indirect heat exchange with the adsorption zone effluent in the second, oxidation catalyst zone to heat the adsorption zone effluent within the second, oxidation catalyst zone.

16. Apparatus for treating an exhaust stream containing pollutants comprising hydrocarbons, the apparatus comprising:

a first catalyst contained within a first catalyst zone which has an inlet which is connectible in gas-flow communication with a source of the exhaust stream and an outlet for discharging effluent of the first catalyst zone;

an indirect heat exchanger having a cold side flow path including a cold side inlet and a cold side outlet, and a hot side flow path including a hot side inlet and a hot side outlet, the hot side inlet being connected in gas-flow communication with the outlet of the first catalyst zone to receive the effluent thereof;

a hydrocarbon adsorbent material contained within an adsorption zone which has an adsorption zone inlet connected in gas-flow communication with the hot side outlet of the heat exchange zone and an adsorption zone outlet;

a second oxidation catalyst contained within a second oxidation catalyst zone having a second catalyst zone inlet connected in gas-flow communication directly with the adsorbent zone outlet; and a second catalyst zone outlet for discharge from the second catalyst zone of the treated exhaust.

17. The apparatus of claim 16 further including coolant supply means connected to the cold side inlet of the heat exchanger to introduce a coolant fluid into the heat exchanger through the cold side flow path thereof, and first fluid conduit means connecting the cold side outlet of the heat exchanger in fluid flow communication with the second catalyst zone inlet.

18. The apparatus of claim 17 wherein the coolant supply means comprises an air pump.

19. The apparatus of claim 16 or claim 17 further including second fluid conduit means connected at one end to the cold side outlet and connected at its other end to a second heat exchanger.

20. The apparatus of claim 16 or claim 17 wherein the first catalyst zone comprises one flow path side of an indirect heat exchanger and the second, oxidation catalyst zone comprises the other flow path side of the indirect heat exchanger.

21. The apparatus of claim 16 or claim 17 wherein the first catalyst is a three-way conversion catalyst.

22. The apparatus of claim 17 or claim 18 wherein the adsorbent material is selected from the class consisting of activated carbon, zirconia-alumina, zirconia-titania and zirconia-silica, silica-alumina and one or more zeolites.

23. The apparatus of claim 16 or claim 17 wherein the adsorbent material comprises activated carbon.

24. The apparatus of claim 16 wherein the second, oxidation catalyst zone comprises one flow path side of a second indirect heat exchanger and wherein the other flow path side of the second indirect heat exchanger is connected by fluid conduit means to the cold side outlet of the first indirect heat exchanger.

* * * * *